(12) United States Patent
Preteseille (10) Patent No.: US 8,385,262 B2
(45) Date of Patent: Feb. 26, 2013

(54) TRANSFERRING DATA IN A DUAL TRANSFER MODE BETWEEN A MOBILE NETWORK AND MOBILE STATIONS

(75) Inventor: Erwan Preteseille, Arnage (FR)

(73) Assignee: ST-Ericsson SA, Geneva (CH)

( * ) Notice: Subject to any disclaimer, the term of this patent is extended or adjusted under 35 U.S.C. 154(b) by 782 days.

(21) Appl. No.: 12/442,919

(22) PCT Filed: Aug. 21, 2007

(86) PCT No.: PCT/IB2007/053338
§ 371 (c)(1),
(2), (4) Date: Nov. 6, 2009

(87) PCT Pub. No.: WO2008/038171
PCT Pub. Date: Apr. 3, 2008

(65) Prior Publication Data
US 2010/0061295 A1 Mar. 11, 2010

(30) Foreign Application Priority Data
Sep. 28, 2006 (EP) ..................................... 06300993

(51) Int. Cl.
*H04W 4/00* (2009.01)
(52) U.S. Cl. ........................................ 370/328; 455/524
(58) Field of Classification Search .................. None
See application file for complete search history.

(56) References Cited

U.S. PATENT DOCUMENTS

| | | | | |
|---|---|---|---|---|
| 6,731,637 B2 * | 5/2004 | Ikeda et al. | ................. | 370/395.2 |
| 6,968,190 B1 * | 11/2005 | Suumaki et al. | ............... | 455/436 |
| 7,082,103 B2 * | 7/2006 | Schieder et al. | .............. | 370/231 |
| 8,121,637 B2 * | 2/2012 | Zhao et al. | ................. | 455/550.1 |
| 2002/0086670 A1 * | 7/2002 | Rajaniemi et al. | ............ | 455/426 |
| 2002/0138635 A1 * | 9/2002 | Redlich et al. | ................ | 709/229 |
| 2003/0021288 A1 * | 1/2003 | Hayashi et al. | ............... | 370/461 |
| 2004/0219921 A1 * | 11/2004 | Cao et al. | ........................ | 455/444 |
| 2004/0266435 A1 * | 12/2004 | de Jong et al. | ................ | 455/436 |
| 2005/0147040 A1 * | 7/2005 | Vayanos et al. | ................ | 370/235 |
| 2005/0181782 A1 * | 8/2005 | Hollis et al. | .................... | 455/424 |
| 2005/0193309 A1 * | 9/2005 | Grilli et al. | ..................... | 714/752 |
| 2005/0198261 A1 * | 9/2005 | Durvasula et al. | ............ | 709/224 |
| 2006/0089137 A1 * | 4/2006 | Howell et al. | .................. | 455/423 |

(Continued)

OTHER PUBLICATIONS

PCT International Search Report, PCT/IB2007/053338, mailing date Feb. 25, 2008.

(Continued)

*Primary Examiner* — Bunjob Jaroenchonwanit
(74) *Attorney, Agent, or Firm* — William J. Kubida; Peter J. Meza; Hogan Lovells US LLP (57) ABSTRACT

A circuit mobility management entity (CMM) is intended a mobile network adapted for transferring data in a dual transfer mode to and from mobile stations. The CMM is arranged, when it has established a circuit-switched (CS) connection between a mobile station and the mobile network and when it receives from a radio resource entity (RR) of the mobile network, a message informing that the CS procedure corresponding to this CS connection is ended, to determine if a GPRS Tunnelling Transport Protocol (GTTP) procedure is running for a packet-switched (PS) signalling procedure which concerns the mobile station, then either i) require release of the CS connection near the RR entity if the GTTP procedure is ended, or ii) maintain the CS connection as long as the GTTP procedure is running, and require release of the CS connection near the RR entity when the GTTP procedure is ended.

15 Claims, 5 Drawing Sheets

U.S. PATENT DOCUMENTS

| | | | |
|---|---|---|---|
| 2006/0211448 A1* | 9/2006 | Reiss et al. | 455/553.1 |
| 2007/0091897 A1* | 4/2007 | Lee et al. | 370/395.5 |
| 2007/0174436 A1* | 7/2007 | Maekawa et al. | 709/223 |
| 2007/0223450 A1* | 9/2007 | Holmstrom et al. | 370/352 |
| 2007/0291749 A1* | 12/2007 | Taki | 370/356 |
| 2008/0014959 A1* | 1/2008 | Karlsson | 455/455 |
| 2009/0059848 A1* | 3/2009 | Khetawat et al. | 370/328 |
| 2009/0086667 A1* | 4/2009 | Sitomaniemi et al. | 370/328 |
| 2009/0213784 A1* | 8/2009 | Ang | 370/328 |
| 2009/0270099 A1* | 10/2009 | Gallagher et al. | 455/435.1 |
| 2009/0279495 A1* | 11/2009 | Yoo | 370/329 |
| 2009/0290529 A1* | 11/2009 | Toyokawa et al. | 370/315 |
| 2010/0118752 A1* | 5/2010 | Suzuki et al. | 370/311 |
| 2010/0215015 A1* | 8/2010 | Miao et al. | 370/329 |
| 2010/0240367 A1* | 9/2010 | Lee et al. | 455/435.2 |
| 2011/0021154 A1* | 1/2011 | Marinier et al. | 455/67.11 |
| 2012/0015652 A1* | 1/2012 | Jung et al. | 455/434 |
| 2012/0072532 A1* | 3/2012 | Iyer | 709/217 |

OTHER PUBLICATIONS

Siemens Ag, Nokia: "Modification to MS?s MM states to enable LCS signalling on RR layer" 3GPP TSG_CN WG1 #17, [Online] No. N1-010841, May 18, 2001, pp. 1-21, XP002468975, URL:http://www.3gpp.org/ftp/tsg_cn/TSG_CN/TSGN_12/Docs/PDF/NP-010272.pdf>, pp. 59.

* cited by examiner

TRANSFERRING DATA IN A DUAL TRANSFER MODE BETWEEN A MOBILE NETWORK AND MOBILE STATIONS

CROSS-REFERENCE TO RELATED APPLICATIONS

The present application relates to, and claims the benefit of and priority to, PCT Application No. PCT/IB2007/053338 filed Aug. 21, 2007, which claims priority to European Patent Application No. 06300993.0 filed Sep. 28, 2006, both of which applications are hereby incorporated by reference in their entireties for all purposes as if fully set forth herein.

FIELD OF THE INVENTION

The present invention relates to dual transfer mode (or DTM) in mobile or cellular communication networks.

BACKGROUND OF THE INVENTION

As it is known by the man skilled in the art and as defined into the 3GPP technical specifications (TS 23.060), the so-called dual transfer mode (or DTM) allows carrying out a packet-switched (PS) signalling procedure through the circuit-switched (CS) domain by means of the GTTP protocol ("GPRS Tunnelling Transport Protocol"). Such a situation notably occurs when a CS connection has been established, for a CS signalling or for a CS voice or data transfer, and GPRS Mobility Management (GMM) procedures or Session Management (SM) procedures need to be carried out in the same time.

When both CS and PS Mobility Management procedures are required (due to a change of area, for instance), these procedures are launched simultaneously starting with the CS procedure first. So, when a CS connection is established, then a PS procedure can be done during the CS connection by means of the GTTP protocol. When the CS procedure is ended, the Circuit Mobility Management (CMM) starts a timer (called T3240) awaiting for the release of the CS connection from the network. So, when the timer T3240 is expired (i.e. after 10 seconds), the CMM aborts the CS connection.

However, the PS procedure might not be completed and it might be still running through GTTP. The CS connection being aborted, the PS procedure cannot continue on CS channels. Therefore in order the PS procedure to continue, GPRS resource allocation procedures must ideally be carried out to establish a temporary block flow (TBF). In uplink (i.e. from the mobile station toward the network), this TBF establishment requires a new access to the network for resource requests, and in both downlink (i.e. from the network toward the mobile station) and uplink, the network has to allocate new resources to the mobile station. These new access and new resource allocation slow down the PS signalling procedures.

Moreover, when the CS connection has been aborted, the Radio Resource entity (RR) may need to perform a re-acquisition of System Information (SI), and possibly a cell reselection. So the above mentioned GPRS resource allocation procedures are delayed until the SI re-acquisition and the possible cell reselection are completed in the Radio Resource entity. This still increases the slowing down of the PS signalling procedures.

OBJECT AND SUMMARY OF THE INVENTION

So, the object of this invention is to overcome the above mentioned drawback.

For this purpose, it provides a process, intended for transferring data in a dual transfer mode (DTM) between a mobile communication equipment and a mobile communication network, and comprising in carrying out a PS signalling procedure, by means of a GTTP protocol through a CS connection established between the mobile communication network and this mobile communication equipment, in order to establish a PS connection between the mobile communication network and this mobile communication equipment.

This process is characterized in that it comprises, when the CS procedure corresponding to the CS connection is ended, to determine if a GTTP procedure is running for the PS signalling procedure, then i) either to release the CS connection if the GTTP procedure is ended, ii) or to maintain the CS connection as long as the GTTP procedure is running, and to release the CS connection when this GTTP procedure is ended.

In other words, the invention proposes to maintain the CS resources a longer time, if necessary, to allow the GTTP procedure, used for the PS signalling procedure through the CS connection, to end. This allows to speed up the PS signalling procedure, to limit the resource allocation, and to avoid the PS signalling procedure to be interrupted by the SI acquisition and cell reselection that might happen at the end of the CS connection.

The process according to the invention may include additional characteristics considered separately or combined, and notably:

in i), one may start a first timer when one receives an information informing that the GTTP procedure is ended and one releases the CS connection when this first timer is expired and if this CS connection has not yet been released by the network;

in i), if one receives an information informing that a GTTP procedure is started while the first timer is not yet expired, then one may start a second timer to maintain the CS connection awaiting for the end of this GTTP procedure;

in ii), one may start a second timer first (with a longer duration than the first timer) when one receives an information informing that the GTTP procedure is still running, then either one may release the CS connection when this second timer is expired, or one may start the first timer when the GTTP procedure ends before expiration of this second timer and one releases the CS connection when the first timer is expired;

in ii), if one receives an information informing that the CS connection has been released by the network before expiration of the second timer, then one may stop the second timer and continue with the PS signalling procedure on the PS domain through a PS connection (for instance a TBF).

The invention also provides a circuit mobility management (CMM) entity, intended for a mobile communication network adapted for transferring data in a dual transfer mode to and from mobile communication equipments.

This CMM entity is characterized in that it is arranged, when it has established a CS connection between a mobile communication equipment and the mobile communication network and when it receives a message informing that the CS procedure corresponding to this CS connection is ended, from a RR entity of the mobile communication network, to determine if a GTTP procedure is running for a PS signalling procedure concerning the mobile communication equipment, then i) either to require the releasing of the CS connection near the RR entity if the GTTP procedure is ended, ii) or to maintain the CS connection as long as the GTTP procedure is running, and to require the releasing of the CS connection near the RR entity when this GTTP procedure is ended.

The CMM entity according to the invention may include additional characteristics considered separately or combined, and notably:

it may be arranged to start a first timer in i) when it receives an information informing that the GTTP procedure is ended and to require the releasing of the CS connection near the RR entity when this first timer is expired and if this CS connection has not yet been released by the network;

it may be arranged in i), when it receives an information informing that a GTTP procedure is started while the first timer is not yet expired, to start a second timer in order to maintain the CS connection till the end of this GTTP procedure;

it may be arranged to start, in ii), a second timer first (with a longer duration than the first timer) when it receives an information informing that the GTTP procedure is still running, then either to require the releasing of the CS connection near the radio resource entity when the second timer is expired, or to start the first timer when it receives an information informing that the GTTP procedure is ended before expiration of the second timer and to require the releasing of the CS connection near the RR entity when the first timer is expired;

it may be arranged, in ii), when it receives an information informing that the CS connection has been released by the network before expiration of the second timer, to stop this second timer in order to allow the PS signalling procedure to continue on the PS domain through a PS connection (for instance a TBF).

The invention also proposes a mobile communication equipment (for a mobile communication network) comprising a circuit mobility management entity (CMM) such as the one above introduced.

The invention also proposes a mobile communication equipment (for a mobile communication network) arranged for participating to a data transfer process such as the one above introduced, to carry out a packet-switched signalling procedure by means of a GTTP protocol through a circuit-switched connection established between itself and the mobile communication network, in order to establish a packet-switched connection.

BRIEF DESCRIPTION OF THE DRAWINGS

Other features and advantages of the invention will become apparent on examining the detailed specifications hereafter and the appended drawings, in which:

FIG. 3 illustrates a variant of the first situation illustrated in FIG. 2, FIG. 4 schematically illustrates the main steps of an example of embodiment of a process according to the invention in a second situation where the CMM entity maintains the CS connection till it is informed that the GTTP procedure is ended.

DESCRIPTION OF EMBODIMENTS

The appended drawings may not only serve to complete the invention, but also to contribute to its definition, if need be.

The invention aims at allowing CS resources of a mobile communication network, that are used for carrying out a PS signalling procedure during a dual transfer mode (DTM) between a mobile communication equipment (or mobile station) and the mobile communication network, to be maintained till the end of the PS signalling procedure which is done with a GTTP protocol through the CS connection.

In the following description it will be considered that the mobile (or cellular) communication network, is a GPRS/EDGE network. But, the invention is not limited to this type of mobile (or cellular) communication network. It applies to any type of GSM mobile communication network capable of allowing a dual transfer mode (DTM) such as defined in the introductory part. Moreover, in the following description it will be considered that the mobile communication equipments (or mobile stations) are mobile (or cellular) telephones. But, the invention is not limited to this type of mobile communication equipment. It applies to any type of mobile communication equipment capable of exchanging data with another communication equipment and implementing DTM and the GSM standard. So, it may be also a GSM laptop, a GSM personal digital assistant (PDA), or a GSM network card (such as those equipping vehicles), for instance.

Figure 1:
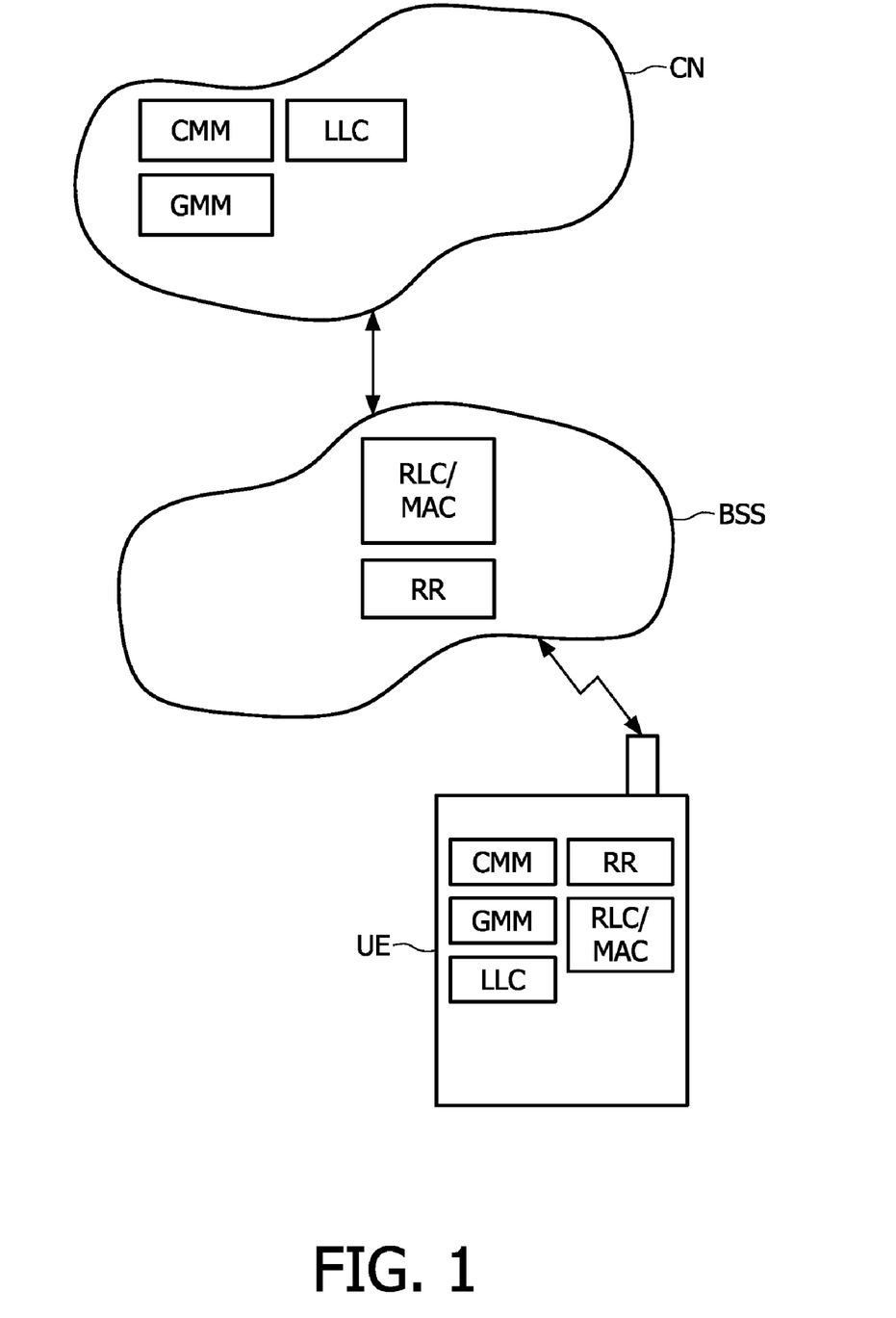
FIG. 1 schematically illustrates a mobile communication network to which is connected a mobile communication equipment (such as a mobile phone), FIG. 2 schematically illustrates the main steps of an example of embodiment of a process according to the invention in a first situation where the CMM entity is informed that the GTTP procedure is ended before being informed of the CS connection release.

An example of mobile communication network (CN, BSS) is schematically illustrated in FIG. 1. Such a mobile communication network comprises essentially a core network CN and a radio access network BSS connected one to the other. Mobile communication equipments (such as mobile phones) UE can be connected to the mobile communication network through its radio access network BSS.

Before describing the invention in details one will review hereafter the entities which are directly or indirectly involved by the invention, with reference to FIG. 1.

One means here by "entities" software layers which intervene during establishment or release of a CS or PS connection and/or during a CS or PS signalling procedure. Such entities are generally shared between network equipments of the radio access network, such as base station controllers (for instance BSCs), and of the core network (for instance MSCs), and mobile communication equipments (or mobile stations).

A first entity is called CMM, for "Circuit Mobility Management". It is provided for the mobility of user mobile stations, such as informing the network of its current location and providing user identity confidentiality for the CS part. A further function of the CMM entity (or sublayer) is to provide connection management services to the different entities of the upper Connection Management (CM) sublayer. This entity is present in the mobile communication equipment and in the network (MSC ("Mobile Switching Center")). It is defined in 3GPP TS 24.008.

A second entity is called GMM, for "GPRS Mobility Management". It is provided for the mobility of user mobile stations, such as informing the network of its current location and providing user identity confidentiality for the PS part. A further function of the GMM entity (or sublayer) is to provide connection management services to the different entities of the upper Connection Management (CM) sublayer. This entity is present in the mobile communication equipment and the core network (SGSN node). It is defined in 3GPP TS 24.008.

The GMM and CMM entities (or sub-layers) are two parts of the MM sub-layer respectively dedicated to the PS domain and CS domain.

A third entity is called LLC, for "Logical Link Control". It is provided for logical link management functions with the maintenance of a communication channel between an individual mobile station and the mobile network (PLMN) across the radio interface. It is located in the mobile station and in the SGSN node in the core network. It is defined in 3GPP TS 44.064.

A fourth entity is called RR, for "Radio Resource". It is a protocol which controls the resources over an interface. It is responsible for monitoring, establishing, maintaining and releasing the radio resources. Its peer entity within the mobile network is located in the base station system (BSS) for GSM (and RNS for UMTS). It is defined in 3GPP TS 44.018.

A fifth entity is called RLC/MAC, for "Radio Link Control/ Medium Access Control". It is responsible for monitoring, establishing, maintaining and releasing the PS radio resources in GSM/GPRS, and insuring the correct data transmission/reception. It is located in the mobile station and in the radio access network (BSS) of the mobile network. It is defined in 3GPP TS 44.060.

In the FIGS. 2 to 5 the network entity designates the radio access network (BSS) and a part of the core network (MSCs and SGSNs) of the mobile network. It is the entity which talks with a mobile station.

The invention proposes a process dedicated to the transfer of data in a dual transfer mode (DTM) between a mobile communication network (called hereafter "network") and a mobile station when a CS connection has been already established between them.

It is important to notice that the CS connection may have been established for any purpose, and for instance for signalling, or voice call, or else short message (SMS) transmission.

It will be considered hereafter, as a non limiting example, that the data transfer in DTM is triggered by the change of area (or cell) of a mobile station.

This process comprises in two main phases. The first phase is intended for carrying out a circuit-switched (CS) signalling procedure between the CMM entity and the network entity in order to establish a CS connection through a CS domain of the network. This first phase is well known by the man skilled in the art and notably defined in the technical specifications of the 3GPP TS 24.008, and TS 23.060.

Figure 2:
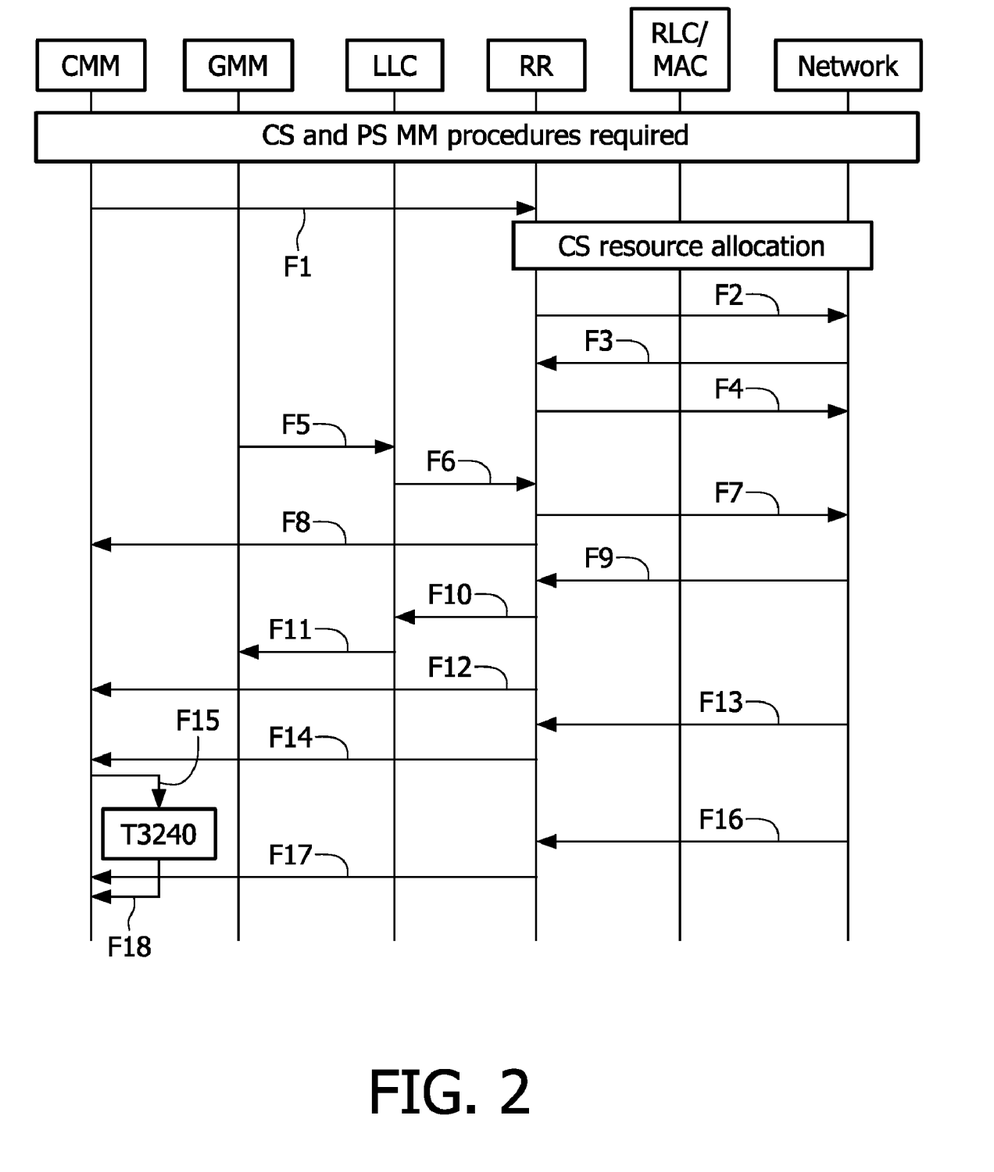

As it is illustrated in FIG. 2, the first phase starts when CS and packet-switched (PS) mobility management (MM) procedures are required simultaneously and done through DTM procedures.

The CS mobility management procedure (hereafter called "CS signalling procedure") is initiated by the CMM entity. More precisely, the CMM entity generates a request (or message) F1, for instance a "LOCATION UPDATE request", to order to the radio resource (RR) entity to establish a CS connection and to transfer the update of the location of the mobile station.

When the RR entity receives this request, it accesses randomly to the network entity F2 to require allocation of CS resources to establish a CS connection between the concerned mobile station and the network.

If it is possible the network entity immediately assigns (or allocates) the required CS resources and informs the RR entity thereof F3. So, a CS connection is established through a CS domain of the network. Then the RR entity forwards the request (or message) received from CMM entity (F1), for instance a "LOCATION UPDATE request", to the network entity F4 in order it updates the location of the mobile station. This establishes the CS connection and ends the first phase.

The second phase is relative to the PS mobility management procedure (hereafter called "PS signalling procedure"). It is initiated by the GMM entity. It starts when the GMM entity generates a request (or message), for instance a "ROUTING UPDATE request", to order to the RR entity to establish a PS connection and to transfer the update of the routing of the mobile station. This request (or message) is first sent to the LLC entity F5. Because a CS connection is already established, the LLC entity transfers this request to the RR entity F6 in order it sends it through the CS connection using GTTP ("GPRS Tunnelling Transport Protocol").

When the RR entity receives this request, it initiates a GTTP procedure through the CS connection. For this purpose it generates a request (or message), for instance a "GTTP ROUTING UPDATE request", to order to the network entity F7 to update the routing of the mobile station.

Then the RR entity sends a message to the CMM entity F8 to signal that a GTTP procedure has been started to perform the CS signalling through the CS connection using GTTP.

At this stage, two situations may occur depending whether the GTTP procedure is quickly ended or not.

Figure 3:
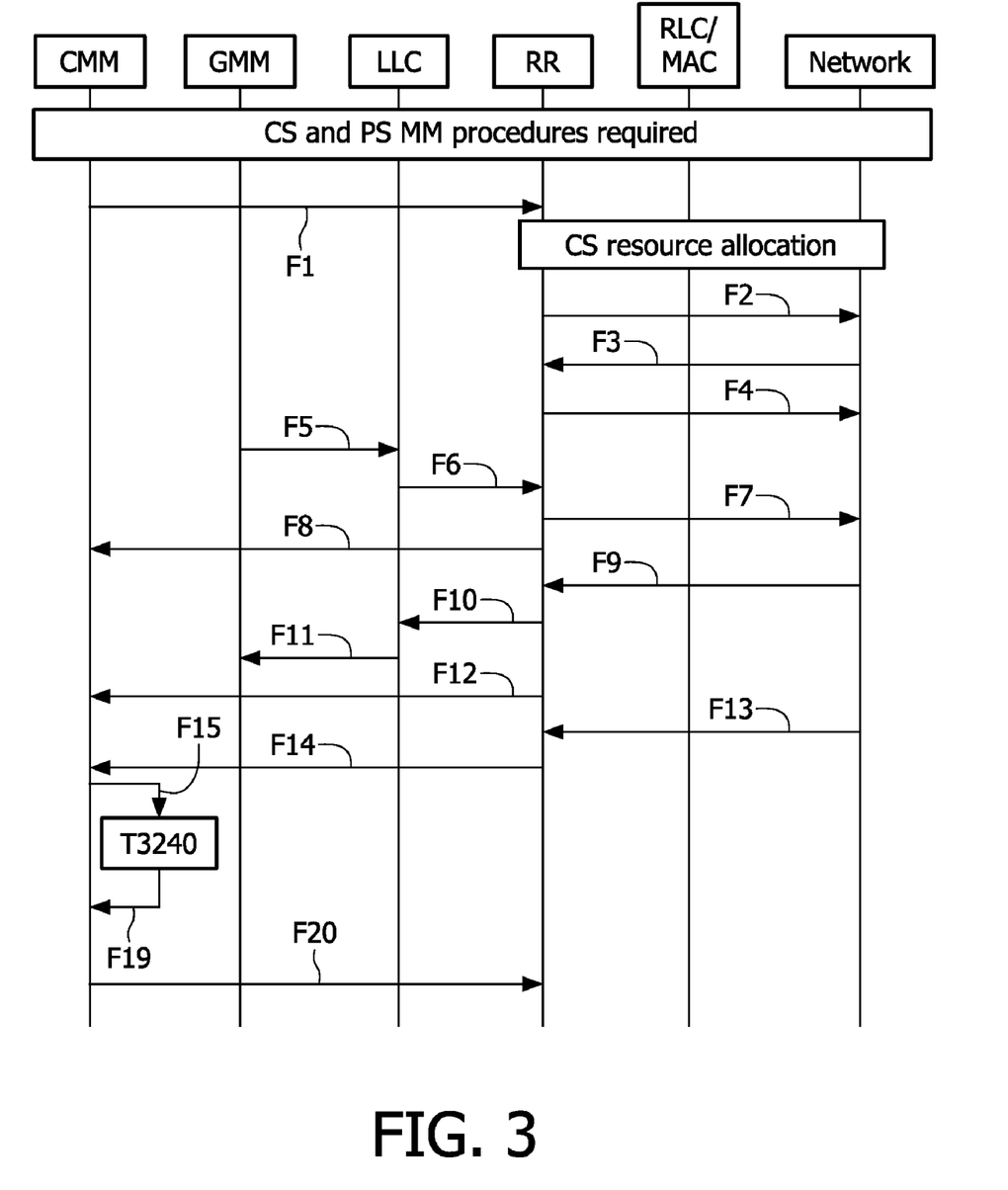

The first situation is illustrated in FIGS. 2 and 3. In this first situation, before the network entity informs the CMM entity that it has updated the mobile station location, it informs the GMM entity that it has completed the routing area updating. For this purpose, it generates a message for the PS signalling through GTTP, for instance a "GPRS ROUTING AREA UPDATE ACCEPT". It sends this message to the RR entity F9, which transfers it towards the LLC entity F10, which in turn transfers it towards the GMM entity F11.

The routing area updating being completed, the GTTP procedure is ended. So, the RR entity sends a dedicated message, for instance called "GTTP PROCEDURE STOP", to the CMM entity F12.

Then the CMM entity waits for a command from the network entity.

When the network entity has updated the mobile station location, it generates a message, for instance a "LOCATION UPDATE ACCEPT". The network entity sends this message to the RR entity F13, and the latter transfers this message towards the CMM entity F14.

When the CMM entity receives this message it learns that the CS connection will be soon released by the network entity. As the CMM entity has been previously informed by means of the dedicated message (F12) that the GTTP procedure was ended, it starts a first timer F15, called T3240, awaiting for the release of the connection by the network.

If the network releases the CS connection, it sends a message to the RR entity F16, and the latter transfers this message to the CMM entity F17. If the first timer T3240 is not yet expired (as illustrated in FIG. 2), the CMM entity stops it F18. At this stage, the RR entity may possibly trigger a re-acquisition of System Information (SI) and/or a cell reselection, if required, which do(es) not slow down the PS signalling procedure.

Now and as illustrated in FIG. 3, if the first timer T3240 is expired before the CMM entity receives this last message (i.e. after 10 seconds) F19, the CMM entity automatically generates a request (or message) F20, for instance an "ABORT_RR CONNECTION", to order to the RR entity to release the CS resources allocated to the CS connection. At this stage, the RR entity may possibly trigger a re-acquisition of System Information (SI) and/or a cell reselection, if required, which do(es) not slow down the PS signalling procedure.

The information relative to the GTTP procedure is preferably both known from the GMM entity and the RR entity. Indeed, the GMM entity knows when a PS signalling procedure is started and completed and the RR entity knows if this PS signalling procedure is launched through a GTTP procedure or not. So, the CMM entity can get the information it needs both from the RR entity and the GMM entity.

Figure 4:
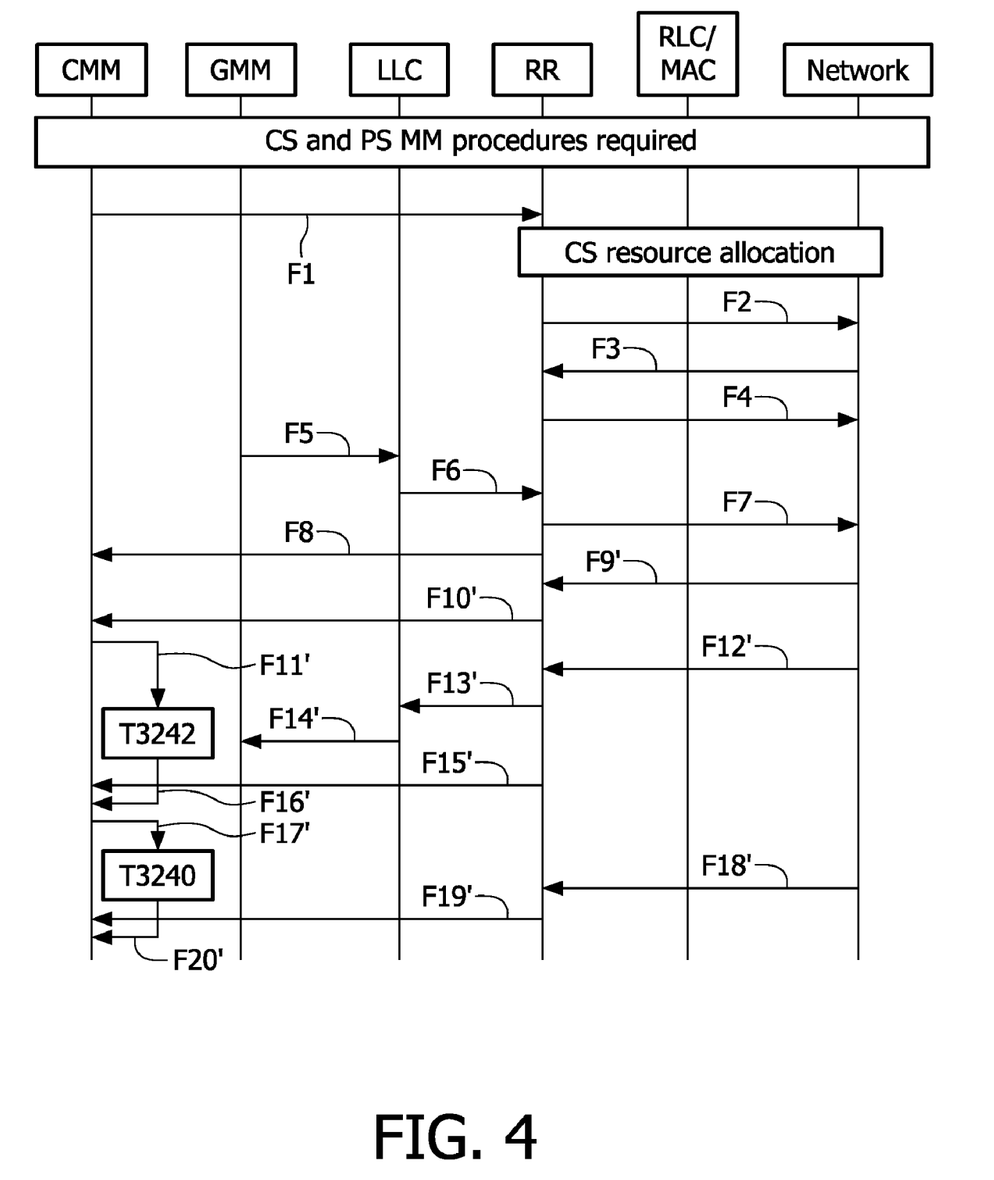
Figure 5:
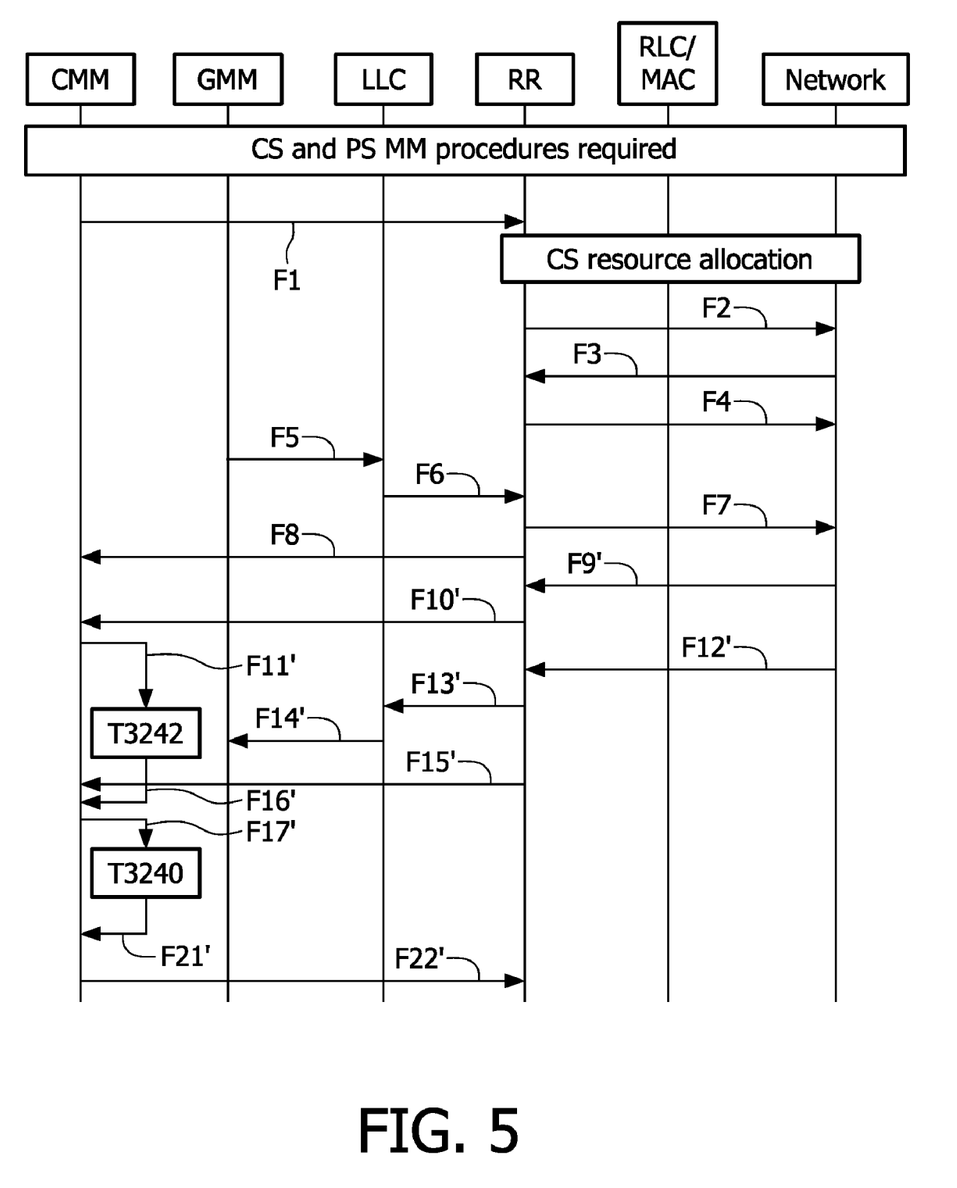
FIG. 5 illustrates a variant of the second situation illustrated in FIG. 4.

The second situation is illustrated in FIGS. 4 and 5. In this second situation, the network entity informs the CMM entity that it has updated the mobile station location before informing the GMM entity that it has completed the routing area updating.

So, when the network entity has updated the mobile station location, it generates a message, for instance a "LOCATION UPDATE ACCEPT". The network entity sends this message to the RR entity F9', and the latter transfers this message towards the CMM entity F10'.

When the CMM entity receives this message it learns that the CS connection will be soon released by the network entity. Then the CMM entity determines if the GTTP procedure is ended. As this is not yet the case, it starts a second timer first F11', for instance called T3242, awaiting for the release of the CS connection by the network but also for a dedicated message informing that the CS signalling procedure through GTTP is ended. The duration of the second timer T3242 is longer than the one of the first timer T3240. For instance the duration of the second timer is comprised between 30 seconds and 60 seconds.

When the second timer T3242 is started the CMM entity is set in a state called "RR CONNECTION RELEASE NOT ALLOWED", for instance. This type of state is known by the man skilled in the art for the RRLP ("Radio Resource LCS protocol") procedure, which is defined into the 3GPP technical specifications TS 24.008, release 99.

The CMM entity is informed that the CS signalling procedure through GTTP is ended when it receives a dedicated message from the RR entity. Such a dedicated message may be called "GTTP PROCEDURE STOP", for instance. Before the RR entity sends this last message to the CMM entity, it must ideally be informed, by the network entity, that the latter has updated the routing area of the mobile station.

So, when the network entity has completed the routing area updating, it generates a message for the PS signalling through GTTP, for instance a "GPRS ROUTING AREA UPDATE ACCEPT". It sends this request to the RR entity F12', which transfers it towards the LLC entity F13', which in turn transfers it towards the GMM entity F14'.

Then the RR entity sends the dedicated message (GTTP PROCEDURE STOP) to the CMM entity F15' in order to inform it that the GTTP procedure is ended.

If the CMM entity receives the GTTP PROCEDURE STOP message before the second timer T3242 is expired (as illustrated in FIG. 4), it stops it F16'. Then, it starts the first timer T3240 F17' awaiting for the release of the connection by the network.

If the network releases the CS connection, it sends a message to the RR entity F18' (as illustrated in FIG. 4), and the latter transfers this message to the CMM entity F19'. If the first timer T3240 is not yet expired (as illustrated in FIG. 4), the CMM entity stops it F20'. At this stage, the RR entity may possibly trigger a re-acquisition of System Information (SI) and/or a cell reselection, if required, which do(es) not slow down the PS signalling procedure.

Now and as illustrated in FIG. 5, if the first timer T3240 is expired F21' before the CMM entity be informed by the network that the CS connection has been released (i.e. after 10 seconds), the CMM entity automatically generates a request (or message) F22', for instance an "ABORT_RR CONNECTION", to order to the RR entity to release the CS resources allocated to the CS connection. At this stage, the RR entity may possibly trigger a re-acquisition of System Information (SI) and/or a cell reselection, if required, which do(es) not slow down the PS signalling procedure.

One will notice that a GPRS authentication procedure may be possibly initiated by the network entity near the GMM entity (through the RR entity and LLC entity) in order to authenticate the mobile station user. Such a procedure may be carried out between F10' and F12'.

Moreover, the RR entity may send the GTTP PROCEDURE STOP message to the CMM entity after having received a ROUTING UPDATE Complete message from the GMM entity through the LLC entity (following upon the reception of the GPRS ROUTING AREA UPDATE ACCEPT (F14')) and after having forwarded this ROUTING UPDATE Complete message to the network entity through GTTP.

To sum up, the invention proposes, when a CMM entity has established a CS connection between a mobile station and a mobile network and when this CMM entity receives (from a RR entity of the mobile network) a message informing that the CS procedure which corresponds to this CS connection is ended, to determine if a GTTP procedure is running for a PS signalling procedure which concerns the mobile station, then i) either to require the releasing of the CS connection near the RR entity if the GTTP procedure is ended, ii) or to maintain the CS connection as long as the GTTP procedure is running, and to require the releasing of the CS connection near the RR entity when this GTTP procedure is ended.

The invention is not limited to the embodiments of process, CMM entity and mobile communication equipment described above, only as examples, but it encompasses all alternative embodiments which may be considered by one skilled in the art within the scope of the claims hereafter.

The invention claimed is:

1. A method of transferring data in a dual transfer mode between a mobile communication equipment device and a mobile communication network, the process comprising:
   carrying out a packet-switched signalling procedure using a GPRS Tunnelling Transport Protocol (GTTP) procedure through a circuit-switched connection established between the mobile communication network and the mobile communication equipment device;
   establishing a packet-switched connection between the mobile communication network and the mobile communication equipment device; and
   determining, when a circuit-switched procedure corresponding to the circuit-switched connection is ended, whether the GTTP procedure is running for the packet-switched signalling procedure, and
   i) when it is determined that the GTTP procedure is ended, beginning a first timer and releasing the circuit-switched connection upon expiration of the first timer, and
   ii) when it is determined that the GTTP procedure is running, starting a second timer, of a duration longer than the first timer, maintaining the circuit-switched connection for no longer than the duration of the second timer, and releasing the circuit-switched connection at expiration of the second timer.

2. The method of claim 1, wherein that in i) the releasing of the circuit-switched connection occurs at the earlier of expiration of the first timer, or the release of the circuit-switched connection by the mobile communication network.

3. The method of claim 1, wherein that in i), when information is received that a new GTTP procedure is started while the first timer is not yet expired, then a starting the second timer to maintain the circuit-switched connection awaiting for the end of the new GTTP procedure.

4. The method of claim 1, wherein that in ii) the second timer is started initially, and upon determining that the GTTP procedure is ended before expiration of the second timer, starting the first timer, and releasing the circuit-switched connection at expiration of the first timer.

5. The method of claim 4, wherein that in ii) when information is received that the circuit-switched connection has been released by the mobile communication network before expiration of the second timer, stopping the second timer and continuing the packet-switched signalling procedure on a packet-switched domain of the mobile communication network through a packet-switched connection.

6. A method of operating a circuit mobility management entity, which is a part of a mobile communication network, and which is operable to transfer data in a dual transfer mode to and from a mobile communication equipment device, the method comprising:
  establishing a circuit-switched connection between a mobile communication equipment device and the mobile communication network;
  receiving a message that a circuit-switched procedure corresponding to the circuit-switched connection is ended from a radio resource entity of the mobile communication network;
  determining whether a GPRS Tunnelling Transport Protocol (GTTP) procedure is running for a packet-switched signalling procedure concerning the mobile communication equipment device; and
  i) when it is determined the GTTP procedure is ended, beginning a first timer and releasing the circuit-switched connection near the radio resource entity upon expiration of the first timer, and
  ii) when it is determined the GTTP procedure is running, starting a second timer, of a duration longer than the first timer, maintaining the circuit-switched connection for no longer than the duration of the second timer, and releasing the circuit-switched connection near the radio resource entity at expiration of the second timer.

7. The method of claim 6, wherein that in i) the releasing of the circuit-switched connection near the radio resource entity occurs at the earlier of expiration of the duration of the first timer, or the release of the circuit-switched connection by the mobile communication network.

8. The method of claim 7, wherein when information is received that a new GTTP procedure is started while the first timer is not yet expired, the second timer is started to maintain the circuit-switched connection until the end of the new GTTP procedure.

9. The method of claim 6, wherein that in ii) the second timer is started initially, and upon determining that the GTTP procedure is ended before expiration of the second timer, starting the first timer, and releasing the circuit-switched connection near the radio resource entity at expiration of the first timer.

10. The method of claim 9, wherein when information is received that the circuit-switched connection has been released by the mobile communication network before expiration of the second timer, stopping the second timer and continuing the packet-switched signalling procedure to continue on a packet-switched domain of the mobile communication network through a packet-switched connection.

11. A circuit mobility management entity which is a part of a mobile communication network and which is operable to transfer data in a dual transfer mode to and from a mobile communication equipment device, the circuit mobility management entity comprising:
  means for establishing a circuit-switched connection between the mobile communication equipment device and the mobile communication network;
  means for receiving a message that a circuit-switched procedure corresponding to the circuit-switched connection is ended, from a radio resource entity of the mobile communication network, and for determining whether a GPRS Tunnelling Transport Protocol (GTTP) procedure is running for a packet-switched signalling procedure concerning the mobile communication equipment device;
  means for starting a first timer when it is determined the GTTP procedure is ended and releasing the circuit-switched connection near the radio resource entity upon expiration of the first timer; and
  means for starting a second timer, of a duration longer than the first timer, when it is determined the GTTP procedure is running, and maintaining the circuit-switched connection for no longer than the duration of the second timer, and releasing the circuit-switched connection near the radio resource entity at expiration of the second timer.

12. The circuit mobility management entity of claim 11, wherein when it is determined the GTTP procedure is ended, the releasing of the circuit-switched connection near the radio resource entity occurs at the earlier of expiration of the first timer, or the release of the circuit-switched connection by the mobile communication network.

13. The circuit mobility management entity of claim 12, wherein when information is received that a new GTTP procedure is started while the first timer is not yet expired, the second timer is started to maintain the circuit-switched connection until the end of the new GTTP procedure.

14. The circuit mobility management entity of claim 11, wherein when it is determined that the GTTP procedure is still running, the second timer is started initially, and upon determining that the GTTP procedure is ended before expiration of the second timer, starting the first timer, and releasing the circuit-switched connection near the radio resource entity at expiration of the first timer.

15. The circuit mobility management entity of claim 14, wherein, when information is received that the circuit-switched connection has been released by the mobile communication network before expiration of the second timer, stopping to stop said the second timer and continuing the packet-switched signalling procedure on a packet-switched domain of the mobile communication network through a packet-switched connection.

* * * * *

UNITED STATES PATENT AND TRADEMARK OFFICE
CERTIFICATE OF CORRECTION

PATENT NO. : 8,385,262 B2
APPLICATION NO. : 12/442919
DATED : February 26, 2013
INVENTOR(S) : Erwan Preteseille It is certified that error appears in the above-identified patent and that said Letters Patent is hereby corrected as shown below:

In the Specifications:

Column 10, lines 2-3, delete "to continue"

Column 10, line 54, delete "to stop said"

Signed and Sealed this
Twenty-third Day of April, 2013

Teresa Stanek Rea
*Acting Director of the United States Patent and Trademark Office*